Dec. 6, 1932.  J. ROBINSON  1,890,410
AUTOMATIC TRAIN PIPE CONNECTER HEAD
Original Filed June 17, 1929  2 Sheets-Sheet 1
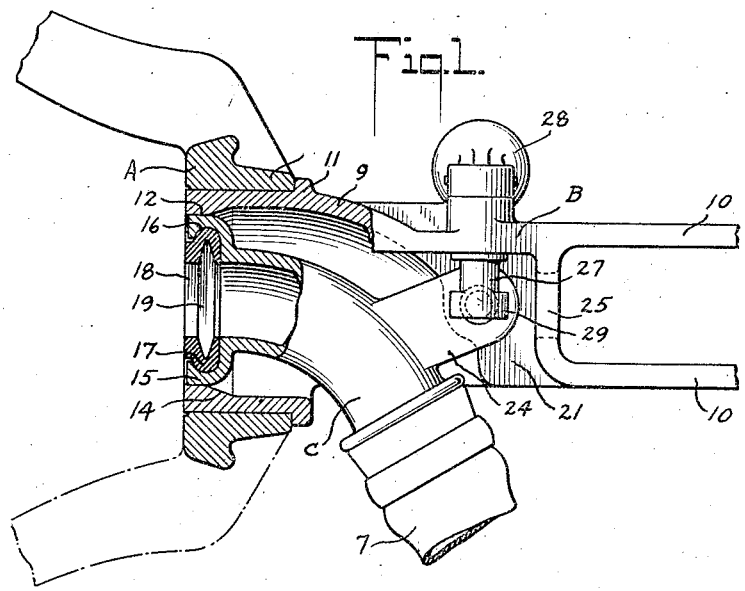
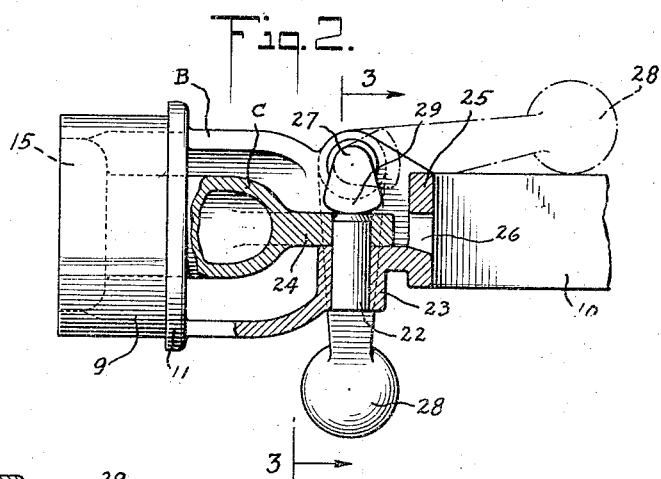
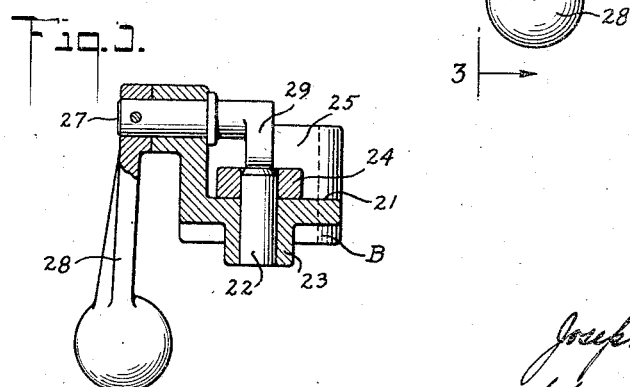
INVENTOR
Joseph Robinson
BY
Watson, Coit, Morse & Grindle
ATTORNEY

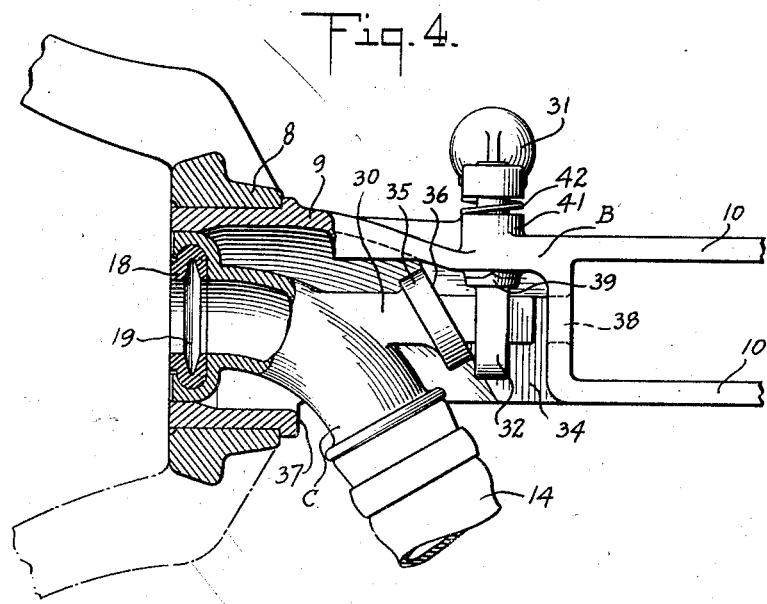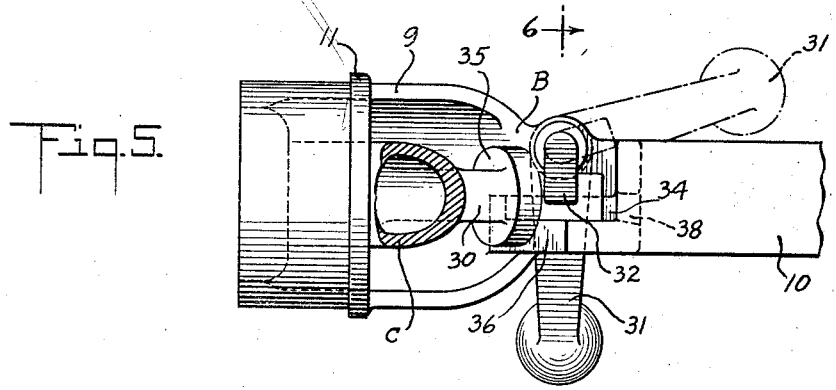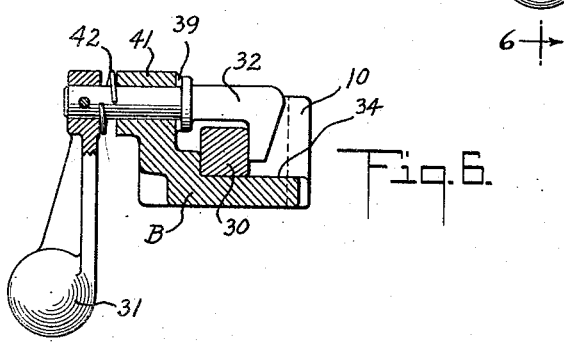

Patented Dec. 6, 1932

1,890,410

UNITED STATES PATENT OFFICE

JOSEPH ROBINSON, OF NEW YORK, N. Y.

AUTOMATIC TRAIN PIPE CONNECTER HEAD

Application filed June 17, 1929, Serial No. 371,480. Renewed February 17, 1932.

This invention relates to automatic train pipe connecters, and particularly to means for replacing defective gaskets in the coupling head thereof while mated heads remain coupled. The construction is an improvement on the arrangement shown and described in my co-pending application, Serial #357,853 filed April 24th, 1929.

In the accompanying drawings, Figure 1 is a sectional plan view of my improvement. In this view only a part of the coupling head A and its supporting means are shown;

Figure 2 is a sectional side elevation of the construction shown in Figure 1. In this view the coupling head is omitted and the rear end of the fitting or conduit C has been cut away to more clearly show the parts;

Figure 3 is a sectional front view on approximately the line 3—3 of Figure 2;

Figure 4 is a sectional plan view of a modification of my improvement;

Figure 5 is a sectional side elevation of the modification. In this view the coupling head is not shown, and Figure 6 is a sectional front view on approximately the line 6—6 of Figure 1.

The coupling head A may be of any desired type, either the pin and funnel or the wing type. I preferably provide the head with a sleeve or shank 8 into which is pressed, or otherwise secured to the head, the enlarged hollow forward end or chamber 9 of a suitably rearwardly extending carrier or yoke, though the front end of such carrier may be otherwise formed and otherwise secured to the head if desired. The carrier includes spaced straps or members 10 adapted to span the usual bracket (not shown) which attaches the connecter to the car. The straps are preferably integral with the chamber 9, which is provided with an annular ring or shoulder 11 against which the shank 8 of the coupling head A abuts to position the head on the shank and to prevent the head shifting thereon under the strains of service. The front face of the shank is approximately flush with the coupling face of the head A as shown in Figure 1, and is provided with an interior annular flange or seat 12, slightly tapered at 14 to facilitate inserting therein the head 15 of the tubular conduit C. The conduit curves laterally out of an opening in one side of the chamber as shown, and is connected in any desired manner to a suitable hose 7. The weight and resistance of the hose, especially when pressure fluid is admitted thereto, tends constantly to draw or pull the conduit C downwardly and hold it on its seat and anchor device later described. The head 15 of the conduit is provided with an interior annular groove or seat 16 in which is mounted the complementary flange 17 of resilient gasket 18. The flange of the gasket is also grooved annularly as at 19, and the coupling face thereof lies approximately in the plane of the coupling face of the head A, as illustrated. The groove 19 admits to the gasket the fluid pressure carried, which expands the gasket axially and readily into air tight engagement with the walls of its seat in the conduit C and against the face of a mating gasket. To support the conduit C horizontally in the chamber 9 I provide the carrier B with a seat 21. Extending upwardly through the underside of the carrier I provide an anchor device or pin 22, which is pressed into or otherwise secured in a bearing 23, and which receives the perforated rear end of the projection or lug 24 of the conduit C. A transversely extending wall 25 joins the forward ends of the straps 10, and adjacent the pin 22 I provide this wall with an opening 26 to facilitate exit from the seat of foreign substances that might accumulate thereon.

Extending transversely of the yoke or carrier B, and rotatably mounted therein, I provide a swinging latch 27 having a weighted handle 28 and a cam shaped tongue or lip 29, the latter being disposed above the pin 22 and adapted to swing across the upper end thereof and across the path of the lug 24, as shown. Normally the lug 24 of the conduit C rests on the bench or seat 21 with the pin 22 extending through the lug. The lip 29 is normally swung across the path of the lug as shown in Figures 1, 2, and 3. When it is desired to remove the conduit C, the latch 27 is swung upwardly to the position shown in dotted lines in Figure 2, whereupon the conduit may be lifted off the pin 22 and removed from the head A and the carrier B.

Any suitable means may be provided for locking the latch 27 in the service position. In Figures 4, 5 and 6 I illustrate a modification of my improvement, in which the latch is provided with such a locking arrangement. In this modification the conduit C is provided with a rearwardly extending finger or lug 30 preferably rectangular in cross section, and the weighted handle or latch 31 is provided with a transversely extending dog or hook 32 that is adapted to be rotated downwardly in front of the lug 30 of the conduit C, to lock the latter in position on the seat 34 of the carrier B. An annular ring or shoulder 35 is formed on the lug, and the face thereof is machined to mate with the machined face or seat 36 of the carrier. These machined surfaces are angled as shown to permit easy removal and insertion of the conduit C. To prevent the conduit from shifting forward in the hollow chamber unduly, the conduit is curved closely around the point 37 of the hollow end or chamber 9 of the carrier, whereby the conduit cannot move unduly forward in the head A. As aforesaid, the lug 30 rests on a bench or seat 34 formed at the forward end of the carrier B similar to the construction shown in Figures 1, 2 and 3. A perforation 38 is provided in the carrier to permit exit of foreign substances as heretofore described. To lock the dog 32 in position I provide the latter with a transversely extending tongue or rib 39 adapted to mate with a complementary groove formed in the carrier B, as shown. Between the weighted handle 31 and the bearing 41 in the carrier through which the latch extends, and surrounding the dog 32, I mount a suitable spring or washer 42 which constantly holds the rib 39 in the groove. Thus when it is desired to swing the handle to the unlocked position as shown in dotted lines in Figure 2 the spring 42 must be compressed to permit the rib to move out of the groove.

It will be understood that the rearward pressure of the fluid carried will drive the annular shoulder 35 against the angled surface 36 and tend to shift the fitting laterally out of the carrier. This will force the lug 30 laterally firmly against the dog 32 thus increasing the locking effect of the dog on the lug. It will be understood that this locking arrangement may be applied to the construction shown in Figures 1, 2 and 3, and that the rearward pressure of the fluid carried will, under the expansion of the gasket 18, kick the conduit C rearwardly firmly against the pin 22 and thus compensate for any wear thereon. Similar compensation for wear on the annular ring 35 of the construction shown in Figure 4 is provided.

My co-pending application Serial #488,373 filed July 29th, 1921 shows and describes how the straps 10 may be extended rearwardly to span the usual supporting bracket, not shown. It will be understood of course that in lieu of the straps 10, any suitable projection or other device may be substituted to connect the carrier B with the connecter bracket.

What I claim is:

1. In combination, an automatic train pipe connecter head having an opening therein, a carrier on which the head is suitably mounted, said carrier being provided with a seat, a projection rigidly connected to and extending away from said seat, a conduit mounted in the opening in said head and having a portion which rests on said seat and through which said projection extends, said conduit being removably mounted on said seat and in said opening.

2. In combination, an automatic train pipe connecter head having an opening therein, a carrier for the head, said carrier being provided with a seat, a projection rigidly connected with and extending away from said seat, a conduit removably mounted in said head and on said seat and having a lug through which said projection extends, and means for locking said lug on said seat and on said projection.

3. In combination, an automatic train pipe connecter head having an opening therein, a carrier for the head, said carrier being provided with a seat, a projection rigidly connected with and extending away from said seat, a conduit removably mounted in said head and on said seat and having a lug through which said projection extends, and means for locking said lug on said seat, said means being movable transversely of said projection.

4. In combination, an automatic train pipe connecter head having an opening therein, a conduit removably mounted in said opening, a carrier for supporting the head, said carrier being provided with a seat, a lug on said conduit engaging said seat, the seat being provided with an anchor device which engages said lug and secures the conduit in the head and shiftable means disposed above said anchor device and adapted to swing across the path of said lug to maintain the lug in position with respect to said seat and said anchor device.

5. In combination, an automatic train pipe connecter head having an opening therein, a conduit removably mounted in said opening, a carrier for said head, said carrier including a pair of spaced straps which terminate at their forward end in portions secured to said head in supporting relation thereto, the carrier being provided with a seat, a lug on said conduit engaging said seat, said seat being provided with an anchor device rigidly connected therewith which projects upwardly from the seat and terminates below the top of said carrier and which engages said lug, and means tending constantly to hold said conduit in engagement with said anchor device.

6. In combination, an automatic train pipe connecter head having an opening therein, a conduit removably mounted in said opening, a carrier for said head, said carrier including a pair of spaced straps which terminate at their forward end in portions secured to said head in supporting relation thereto, the carrier being provided with a seat, a lug on said conduit engaging said seat, said seat being provided with an anchor device rigidly connected therewith which projects upwardly from the seat and terminates below the top of said carrier and which engages said lug, and means mounted on said carrier and tending constantly to hold said conduit in engagement with said anchor device.

7. In combination, an automatic train pipe connecter head having an opening therein, a conduit removably mounted in said opening, a carrier for supporting the head, said carrier being provided with a seat, a lug on said conduit engaging said seat, and a horizontally disposed pivoted device extending transversely of said lug and arranged to engage the same to hold the lug on said seat.

8. In combination, an automatic train pipe connecter head having an opening therein, a conduit removably mounted in said opening, a carrier for supporting the head, said carrier being provided with a seat, a projection rigidly connected with and extending away from said seat, and a part on said conduit adapted to be passed over said projection into engagement therewith and with said seat.

9. In combination, a carrier for an automatic train pipe connecter head, said carrier having a hollow front end adapted to receive a conduit, a seat on the inner wall of the hollow portion of said carrier upon which a part of a conduit is adapted to rest, a projection rigid with and extending upwardly from said seat and arranged to engage the conduit when mounted on said seat, and a dog pivotally supported on said carrier above said seat for engaging a conduit mounted on the seat.

10. In combination, a carrier for an automatic train pipe connecter head, said carrier having a hollow front end adapted to receive a conduit, a seat formed on the inner wall of the hollow portion of said carrier, a conduit mounted in said hollow portion of the carrier and having a lug adapted to rest on said seat, and a dog pivotally supported in the hollow of said carrier and arranged to hold said lug on said seat.

11. In combination, a carrier for an automatic train pipe connecter head, said carrier having a hollow front end adapted to receive a conduit, an inclined seat formed on the inner wall of the hollow portion of said carrier, a conduit mounted in said hollow portion of the carrier and having a lug extending rearwardly thereof, said lug having an inclined surface thereon adapted to bear against said inclined seat, and a dog pivotally supported on said carrier and arranged to engage said lug and hold the same on said seat.

12. In combination, an automatic train pipe connecter head, a carrier connected to said head and extending rearwardly thereof, a conduit removably mounted on said carrier, said carrier having a seat rearwardly of its front end, a lug on said conduit engaging said seat, and a horizontally disposed pivoted device mounted on said carrier and extending transversely of said lug and arranged to engage the same to hold the lug on said seat.

13. In combination, a carrier having an automatic train pipe connecter head, said carrier having rearwardly of its front end an inclined seat, a conduit supported on said carrier and having a lug extending rearwardly thereof, said lug having an inclined surface thereon adapted to bear against said inclined seat, and a dog pivotally supported on said carrier and arranged to engage said lug and hold the same on said seat.

In testimony whereof I hereunto affix my signature.

JOSEPH ROBINSON.